United States Patent [19]
Flood et al.

[11] Patent Number: 5,486,137
[45] Date of Patent: Jan. 23, 1996

[54] ABRASIVE TOOL INSERT

[75] Inventors: Gary M. Flood, Canal Winchester; David M. Johnson, Westerville; Henry S. Marek, Worthington, all of Ohio

[73] Assignee: General Electric Company, Worthington, Ohio

[21] Appl. No.: 271,307

[22] Filed: Jul. 6, 1994

Related U.S. Application Data

[63] Continuation-in-part of Ser. No. 105,523, Aug. 11, 1993, and a continuation-in-part of Ser. No. 95,631, Jul. 21, 1993.

[51] Int. Cl.$^6$ .................................................. E21B 10/46
[52] U.S. Cl. ........................ 451/540; 175/428; 175/432; 175/434; 407/119
[58] Field of Search .................. 51/204, 209 R; 175/426, 428, 432, 434; 299/79; 76/108.2, DIG. 12; 407/32, 118, 119; 451/540, 548

[56] References Cited

U.S. PATENT DOCUMENTS

| | | |
|---|---|---|
| 4,109,737 | 8/1978 | Bovenkerk . |
| 4,525,179 | 6/1985 | Gigl . |
| 4,629,373 | 12/1986 | Hall . |
| 4,784,023 | 11/1988 | Dennis . |
| 4,858,707 | 8/1989 | Jones et al. . |
| 4,872,520 | 10/1989 | Nelson . |
| 4,954,139 | 9/1990 | Cerutti . |
| 4,972,637 | 11/1990 | Dyer . |
| 4,984,642 | 1/1991 | Renard et al. . |
| 4,997,049 | 3/1991 | Tank et al. . |
| 5,007,207 | 4/1991 | Phaal . |
| 5,011,515 | 4/1991 | Frushour . |
| 5,025,874 | 6/1991 | Barr et al. . |
| 5,037,451 | 8/1991 | Burnand et al. . |
| 5,054,246 | 10/1991 | Phaal et al. . |
| 5,120,327 | 6/1992 | Dennis . |
| 5,172,778 | 12/1992 | Tibbitts et al. . |
| 5,217,081 | 6/1993 | Waldenström et al. . |
| 5,351,772 | 10/1994 | Smith . |

FOREIGN PATENT DOCUMENTS

| | | | |
|---|---|---|---|
| 0322214B1 | 6/1989 | European Pat. Off. . | |
| 369852 | 5/1990 | European Pat. Off. . | |
| 2355990 | 5/1977 | France . | |
| 4152003 | 9/1992 | Japan . | |
| 911004 | 3/1982 | U.S.S.R. . | |
| 1657594 | 6/1991 | U.S.S.R. | 175/434 |
| 93384328/48 | 11/1992 | U.S.S.R. . | |
| 1776550 | 11/1992 | U.S.S.R. | 51/204 |

*Primary Examiner*—Jack W. Lavinder

[57] ABSTRACT

Disclosed is an abrasive tool insert having an abrasive particle layer having an upper surface, an outer periphery, and a lower surface integrally formed on a substrate which defines an interface therebetween. The abrasive particle layer outer periphery forms a cutting plane. The thickness of the abrasive particle layer at its outer periphery cutting plane decreases radially inwardly. Thus, the interface can have a sawtooth shape cross-sectional profile, at least one slot extending from said abrasive particle layer outer periphery radially inwardly, or other configuration based on the precepts of the present invention. Also, the angle of the outwardly sloping profile can be matched to the anticipated angle of the wear plane which will develop as the PDC wears in use.

5 Claims, 5 Drawing Sheets

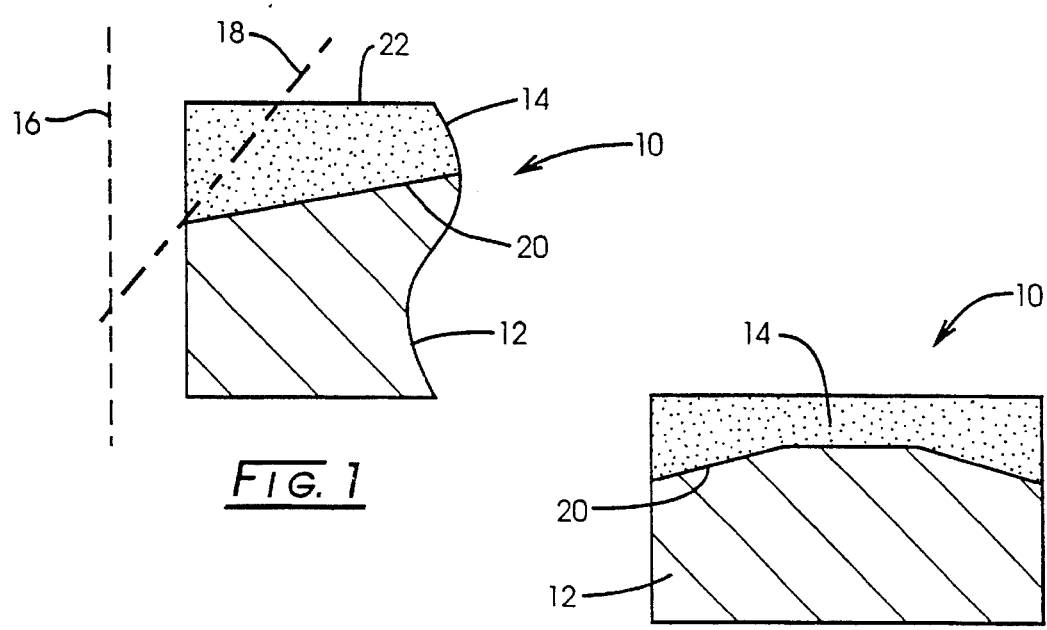
FIG. 1
FIG. 2
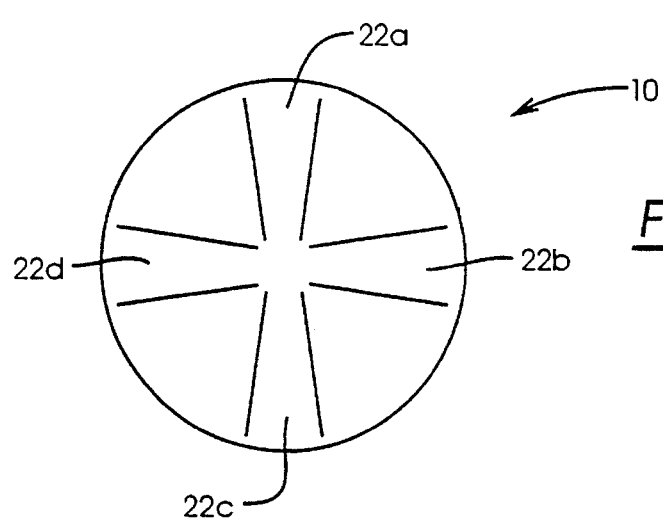
FIG. 3
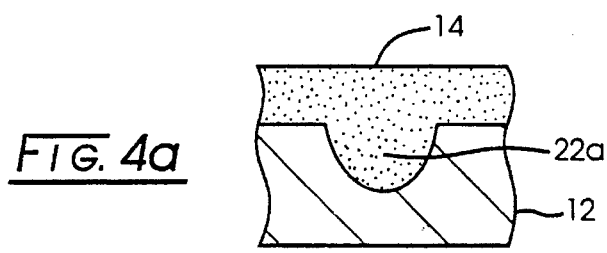
FIG. 4a
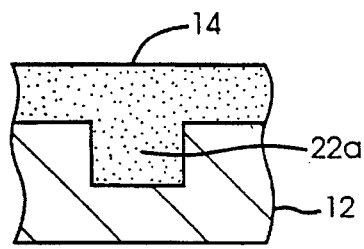
FIG. 4b

ABRASIVE TOOL INSERT

CROSS-REFERENCE TO RELATED APPLICATIONS

This application is a continuation-in-part of applications Ser. Nos. 08/105,523 filed Aug. 11 1993, still pending, and 08/095,631, filed Jul. 21, 1993, still pending, the disclosures of which are expressly incorporated herein by reference.

FIELD OF THE INVENTION

The present invention relates to the field of abrasive tool inserts and, more particularly, to such inserts having an abrasive particle layer outer periphery forming a cutting place wherein the thickness of the abrasive particle layer at its outer periphery cutting plane decreases radially inwardly to provide improved durability and reduced susceptibility to spalling, cracking, and wear of the diamond layer.

BACKGROUND OF THE INVENTION

Abrasive compacts are used extensively in cutting, milling, grinding, drilling, and other abrasive operations. The abrasive compacts typically consist of polycrystalline diamond or cubic boron nitride (CBN) particles bonded into a coherent hard conglomerate. The abrasive particle content of the abrasive compact is high and there is an extensive amount of direct particle-to-particle bonding. Abrasive compacts are made under elevated temperature and pressure conditions at which the abrasive particles, be it diamond or cubic boron nitride, are crystallographically stable.

Abrasive compacts tend to be brittle and, in use, they are frequently supported by being bonded to a cemented carbide substrate. Such supported abrasive compacts are known in the art as composite abrasive compacts. Composite abrasive compacts may be used as such in the working surface of an abrasive tool. Alternatively, particularly in drilling and mining operations, it has been found advantageous to bond the composite abrasive compact to an elongated cemented carbide pin to produce what is known as a stud cutter. The stud cutter then is mounted, for example, in the working surface of a drill bit or a mining pick.

Fabrication of the composite compact typically is achieved by placing a cemented carbide substrate into the container of a press. A mixture of diamond grains or diamond grains and catalyst binder is placed atop the substrate and compressed under high pressure and high temperature (HP/HT) conditions. In so doing, metal binder migrates from the substrate and "sweeps" through the diamond grains to promote a sintering of the diamond grains. As a result, the diamond grains become bonded to each other to form a diamond layer which concomitantly is bonded to the substrate along a conventionally planar interface. Metal binder remains disposed in the diamond layer within pores defined between the diamond grains.

A composite compact formed in the above-described manner may be subject to a number of shortcomings. For example, the coefficients of thermal expansion and elastic constants of cemented carbide and diamond are close but not exactly the same. Thus, during heating or cooling of the polycrystalline diamond compact (PDC), thermally induced stresses occur at the interface between the diamond layer and the cemented carbide substrate, the magnitude of these stresses being dependent, for example, on the disparity in thermal expansion coefficients and elastic constants.

Another potential shortcoming which should be considered relates to the creation of internal stresses within the diamond layer which can result in a fracturing of that layer. Such stresses also result from the presence of the cemented carbide substrate and are distributed according to the size, geometry, and physical properties of the cemented carbide substrate and the polycrystalline diamond layer.

European Patent Application No. 0133 386 suggests a PDC in which the polycrystalline diamond body is completely free of metal binder and is to be mounted directly on a metal support. However, the mounting of a diamond body directly on metal presents significant problems relating to the inability of the metal to provide sufficient support for the diamond body. This European Patent Application further suggests the use of spaced ribs on the bottom surface of the diamond layer which are to be embedded in the metal support.

According to this European Patent Application, the irregularities can be formed in the diamond body after the diamond body has been formed, e.g., by laser or electronic discharge treatment, or during the formation of the diamond body in a press, e.g., by the use of a mold having irregularities. As regards the latter, it is further suggested that a suitable mold could be formed of cemented carbide; in such case, however, metal binder would migrate from the mold and into the diamond body, contrary to the stated goal of providing a metal free diamond layer. The reference proposes to mitigate this problem by immersing the thus-formed diamond/carbide composite in an acid bath which would dissolve the carbide mold and leach all metal binder from the diamond body. There would thus result a diamond body containing no metal binder and which would be mounted directly on a metal support. Notwithstanding any advantages which may result from such a structure, significant disadvantages still remain, as explained below.

In sum, this European Patent Application proposes to eliminate the problems associated with the presence of a cemented carbide substrate and the presence of metal binder in the diamond layer by completely eliminating the cemented carbide substrate and the metal binder. However, even though the absence of metal binder renders the diamond layer more thermally stable, it also renders the diamond layer less impact resistant. That is, the diamond layer is more likely to be chipped by hard impacts, a characteristic which presents serious problems during the drilling of hard substances such as rock.

It will also be appreciated that the direct mounting of a diamond body on a metal support will not, in itself, alleviate the previously noted problem involving the creation of stresses at the interface between the diamond and metal, which problem results from the very large disparity in the coefficients of thermal expansion between diamond and metal. For example, the thermal expansion coefficient of diamond is about $45 \times 10^{-7}$ cm/cm/°C. as compared to the coefficient of $150-200 \times 10^{-7}$ cm/cm/°C. for steel. Thus, very substantial thermally induced stresses will occur at the interface. In addition, once the portions of the diamond which do not carry the ribs begin to wear sufficiently to expose the metal therebehind, that metal will wear rapidly, due to its relative ductility and lower abrasion/erosion resistance, which metal wear would undermine the integrity of the bond between the diamond and the metal support.

Recently, various PDC structures have been proposed in which the diamond/carbide interface contains a number of ridges, grooves, or other indentations aimed at reducing the susceptibility of the diamond/carbide interface to mechanical and thermal stresses. In U.S. Pat. No. 4,784,023, a PDC includes an interface having a number of alternating grooves and ridges, the top and bottom of which are substantially parallel with the compact surface and the sides of which are substantially perpendicular to the compact surface.

U.S. Pat. No. 4,972,637 provides a PDC having an interface containing discrete, spaced-apart recesses extending into the cemented carbide layer, the recesses containing abrasive material (e.g., diamond) and being arranged in a series of rows, each recess being staggered relative to its nearest neighbor in an adjacent row. It is asserted in the '637 patent that as wear reaches the diamond/carbide interface, the recesses, filled with diamond, wear less rapidly than the cemented carbide and act, in effect, as cutting ridges or projections. When the PDC is mounted on a stud cutter, as shown in FIG. 5 of the '637 patent, wear plane 38 exposes carbide regions 42 which wear more rapidly than the diamond material in the recesses 18. As a consequence, depressions develop in these regions between the diamond filled recesses. The '637 patent asserts that these depressed regions, which expose additional edges of diamond material, enhance the cutting action of the PDC.

U.S. Pat. No. 5,007,207 presents an alternative PDC structure having a number of recesses in the carbide layer, each filled with diamond, which recesses are formed into a spiral or concentric circular pattern (looking down at the disc shaped compact). Thus, the '207 structure differs from the '637 structure in that, rather than employing a large number of discrete recesses, the '207 structure uses one or a few elongated recesses which form a spiral or concentric circular pattern. FIG. 5 in the '207 patent shows the wear plane which develops when the PDC is mounted and used on a stud cutter. As with the '637 structure, the wear process creates depressions in the carbide material between the diamond filled recesses in the '207 structure. Like the '207 patent, the '637 patent also asserts that these depressions, which develop during the wear process, enhance cutting action.

Whereas the aforementioned patents assert a desirable cutting action in the rock, it is also highly desirable to minimize the diamond layers susceptibility to fracture and spall which in part arises from the internal residual stresses.

Accordingly, it would be highly desirable to provide a polycrystalline diamond compact having increased resistance to diamond spalling fractures.

SUMMARY OF THE INVENTION

Disclosed is an abrasive tool insert having an abrasive particle layer having an upper surface, an outer periphery, and a lower surface integrally formed on a substrate which defines an interface therebetween. The abrasive particle layer outer periphery forms a cutting plane. The thickness of the abrasive particle layer at its outer periphery cutting plane decreases radially inwardly. Thus, the interface can have a sawtooth shape cross-sectional profile, at least one slot extending from said abrasive particle layer outer periphery radially inwardly, or other configuration based on the precepts of the present invention. Also, the angle of the outwardly sloping profile can be matched to the anticipated angle of the wear plane which will develop as the PDC wears in use.

One advantage of the present invention is a polycrystalline compact having increased useful life. Another advantage of the present invention is a polycrystalline diamond compact having a diamond layer formed such that there is reduced spalling and cracking of the diamond layer as the compact wears. A further advantage of the invention is a PDC in which the carbide layer provides increased mechanical support for the diamond layer as the compact wears. Still another advantage of the invention is a PDC in which the diamond-carbide interface is designed to reduce residual tensile stresses in the location where spalling or delamination usually occurs. Yet still a further advantage is that the outward sloping profiles are disposed in such ways as to provide stress reduction benefit across the most useful portion of the compact during its wear-resistant lifetime.

BRIEF DESCRIPTION OF THE DRAWINGS

The invention will be appreciated by those skilled in the an based on a reading of the Detailed Description below, which is intended to be read in combination with the drawings, in which:

FIG. 1 depicts a cross-sectional view of a portion of a abrasive particle composite compact having an interface which slopes radially inwardly in accordance with the precepts of the present invention;

FIG. 2 depicts an embodiment of the inventive abrasive particle composite compact having slots which slope radially inwardly;

FIG. 3 is an overhead plan view of the location of the slots shown in FIG. 2;

FIGS. 4a and 4b are cross-sectional elevational view of two different profiles of the slots shown in FIGS. 2 and 3;

Figure 5:
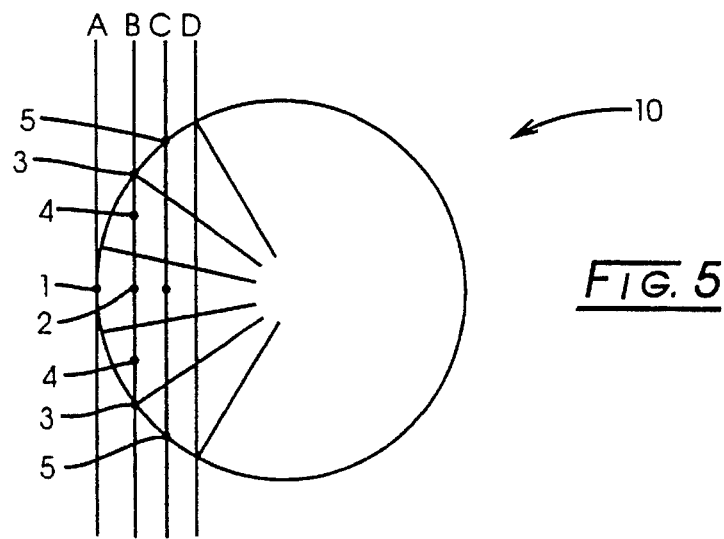
FIG. 5 is an overhead elevational view of an embodiment of the slotted abrasive particle composite compact of FIG. 2 showing the cutting plane as it progresses inwardly during use of the abrasive particle composite compact in cutting applications.
Figure 6:
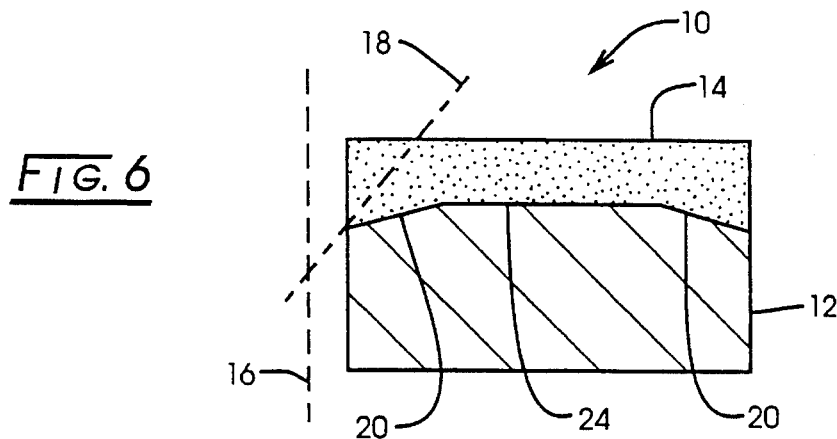
FIG. 6 is a cross-sectional elevational view of another embodiment of the inventive abrasive particle composite compact which has an outer annular sloped interface.
Figure 7:
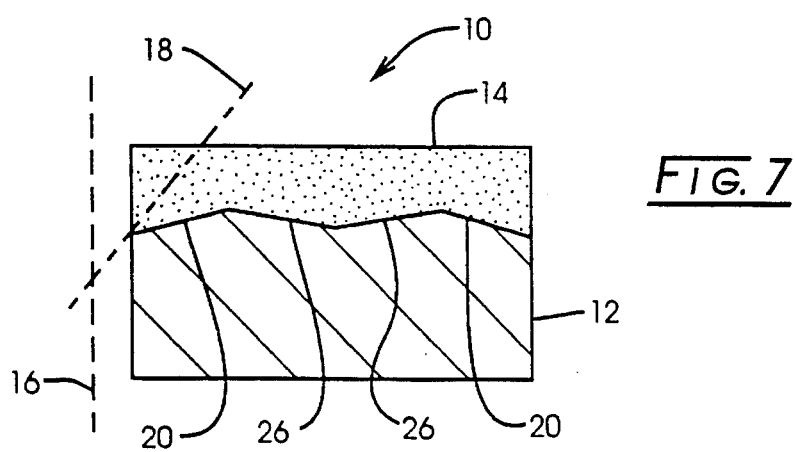
FIG. 7 is a cross-sectional elevational view of another embodiment of the inventive abrasive particle composite compact which has an outer annular sloped interface and an inner conical sloped interface.

The drawings will be described in detail below.

DETAILED DESCRIPTION OF THE INVENTION

Reference initially is made to FIG. 1 which shows an exemplary cross-sectional profile of a portion of a PDC fabricated in accordance with the present invention. PDC 10 includes substrate 12, preferably comprised of cemented carbide, and abrasive layer 14, preferably comprised of polycrystalline diamond. Abrasive layer 14 is integrally bonded to substrate 12 and, in the typical manufacturing process, will be formed by HP/HT processing. Cutting edge 16 and anticipated wear plane 18 also are depicted in FIG. 1. In application, the precise location of edge 16 and plane 18, of course, will depend on the manner in which PDC 10 is mounted on a stud cutter or other support means. Surface 20 slopes outwardly and downwardly from the center of compact 10 toward cutting edge 16 and is angled between about 10° to about 50°, and more preferably between about 25° and 45°, with respect to top surface 22 of abrasive layer 14.

In use, as PDC 10 wears, wear plane 18 (which represents the surface providing cutting action) slowly progresses toward the center of the compact. Until wear plane 18 reaches first sloping surface 20, wear plane 18 intersects only abrasive layer 14, which provides excellent cutting and wear characteristics. Compared to abrasive layer 14, substrate layer 12 wears relatively quickly. Therefore, once wear plane 18 descends beyond first sloping surface 20, substrate material 12 intersecting wear plane 18 erodes more quickly and an abrasive, e.g., diamond, lip forms according to accepted understanding to those knowledgeable of typical PDC wear characteristics.

During drilling, PDC 10 experiences very high stresses in abrasive, or diamond, layer 14, particularly near interface 20 with substrate 12. Such stresses, some of which have been discussed above, lead to fracturing and spalling in the diamond layer. These application stresses occur randomly and intermittently during drilling. They vary in magnitude and direction according to the localized contact dynamics with the rock face and rock particles in the hole. During events characterized by high tensile stress, cracks can form in the diamond layer. These cracks, being subjected to repeated high stress events, can propagate to form fracturing and spalling of the diamond layer. One region particularly susceptible to such occurrence is in abrasive (e.g., diamond) layer 14 at or very near diamond-carbide interface 20. This region, in prior PDC designs, suffers from pre-existing high residual tensile stresses which have been discussed previously.

Advantageously, the cross-sectional profile depicted in FIG. 1 reduces the residual tensile stresses in the diamond or abrasive layer 14 in precisely the region where spalling or delamination occur most frequently, even as wear plane 18 progresses well into compact 10.

A wide variety of composite compact embodiments having polycrystalline abrasive layers of non-uniform thickness and constructed as described and illustrated in FIG. 1 can be envisioned. Several of these embodiments are set forth in the drawings and will be briefly described below.

FIGS. 2–4 depict composite compact 10 having a pattern of angled slots radially decreasing in depth and width from its outer periphery towards its center. Slots 22a–22d (FIG. 2) are filled with polycrystalline abrasive and are configured such that as wear occurs on the edge of abrasive layer 14, for a substantial portion of the life of the cutter, tensile stresses in abrasive layer 14 are reduced compared to those of a flat interface geometry. The profile of slot 22a is depicted at FIGS. 4a and 4b. Of course, the precise profile of the slots can be varied from v-shaped as set forth at FIG. 4a to rectangular as set forth at FIG. 4b.

An added feature of cutters of this embodiment involves orientation of the cutters in a PDC bit. Depending upon the rock formations being cut, the bit design, and the location of the cutters on the bit, some cutter locations are predisposed to wear or chip or spall more heavily at the extreme edges of the wearland. Other cutters are likely to become more damaged in the center of the wearland. Cutters of this embodiment may be oriented in the bit to optimize cutter life depending upon these factors. For example, if there are four slots (as at FIG. 3), a rotation of 45° presents either a thicker or a thinner abrasive layer thickness to the initial cutting surface.

Four equally spaced slots are shown for clarity at FIG. 3; however, 6 or 8 slots presently are believed to be more favorable. Referring to FIG. 5, as the cutter contacts the rock face at wear plane A, the stresses in PCD 10 are minimized at location 1 due to the angled slot interface. As the wear plane progresses toward plane B, less wear would be experienced at location 2 compared to locations 3 and 4 due to the diamond slot being thicker at location 2. Such geometry would thereby cause the angled slot diamond at location 2 to protrude into the rock face relative to locations 3 and 4. Such protrusion would reduce the stresses in the PDC layer at locations 3 and 4, which would otherwise be vulnerable to high crack-inducing stresses.

As the wear plane progresses past plane B, locations 5, otherwise vulnerable to high stresses, would be within the adjoining angled slots, thus reducing the PCD layer stresses at locations 5. The majority of the useful cutting life of a PCD cutter is expired soon after wear plane D is passed. Therefore, by proper orientation of the inventive composite compacts in the drill bit, only angled slots on the cutting half of the compacts would be required. Finally, it should be observed that the number of angled slots can be increased, so as to provide a scalloped interface.

Another embodiment of the novel abrasive tool insert is depicted at FIGS. 6–10. The composite compact at FIG. 1 has outer sloped surface 20 which meets central ridge 24. As illustratively depicted in FIG. 7, PDC 10, the cross-sectional profile of the boundary between substrate 12 and abrasive layer 14 comprises a plurality of sloped surfaces, including outwardly sloping surface 20, and inwardly sloping surface 26.

Figure 8A:
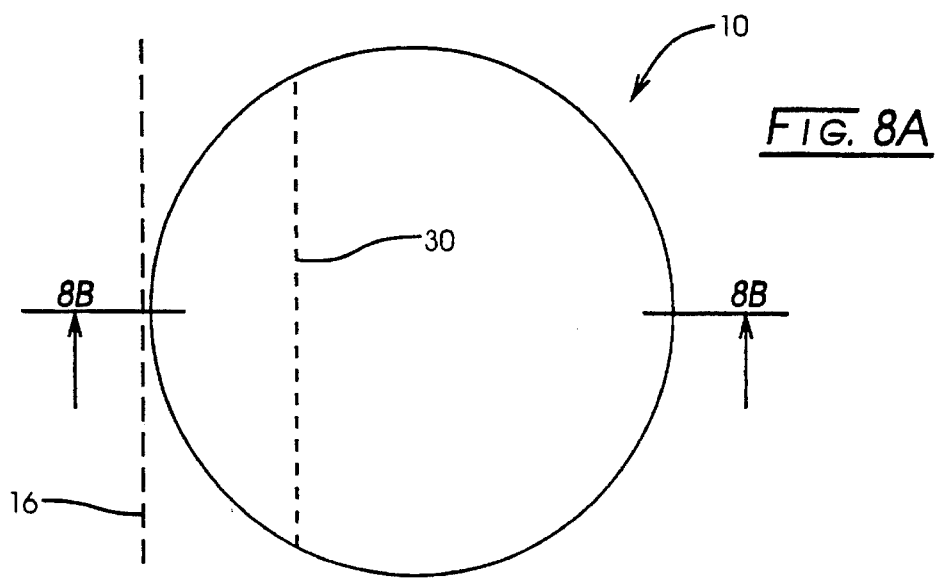
FIGS. 8A and B, respectively, are an overhead plan view and a cross-sectional elevational along line 8B—8B of another embodiment of the inventive abrasive particle composite compact which has a corded outer sloped interface.
Figure 8B:
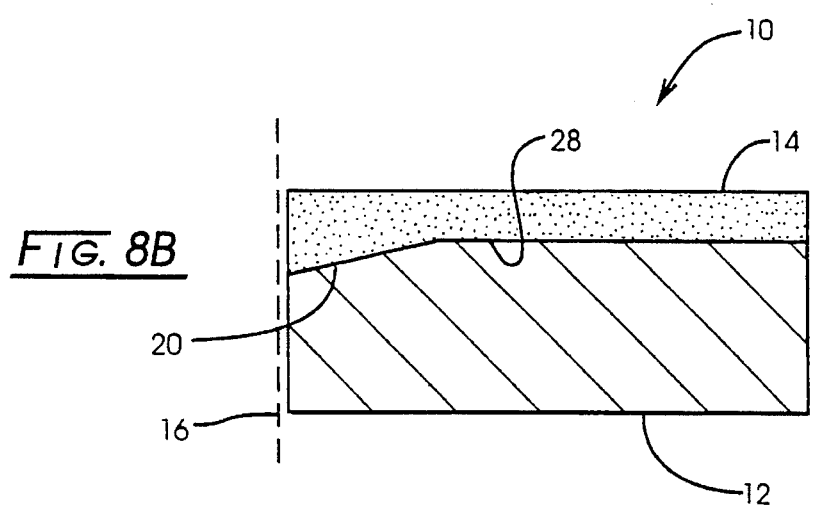

FIGS. 8A and B show PDC 10 wherein sloped surface 20 meets upper flat surface 28 at ridge 30 of the contour forming a chord of the circular compact. In this case sloping contour 20 is a plane extending from cutting edge 16 to ridge 30.

Figure 9A:
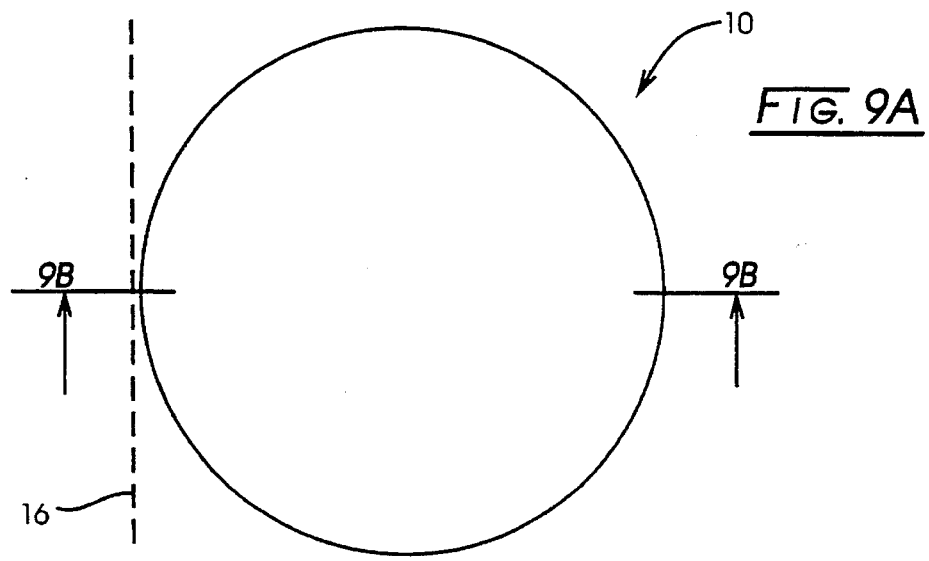
FIGS. 9A and B, respectively, are an overhead plan view and a cross-sectional elevational view along line 9B—9B of another embodiment of the inventive abrasive particle composite compact which has a conical interface.
Figure 9B:
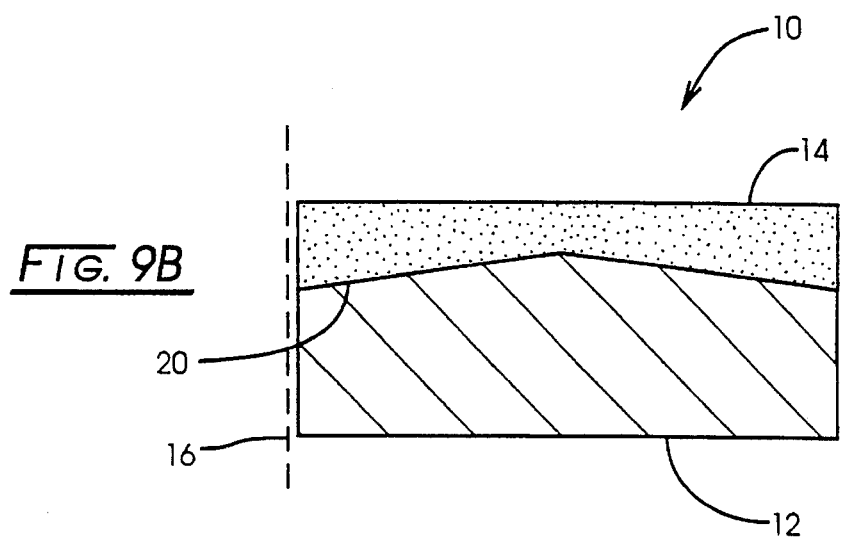

FIGS. 9A and B depict PDC 10 having single concentric sloping contour 20 which forms the entire abrasive/substrate interface.

Figure 10A:
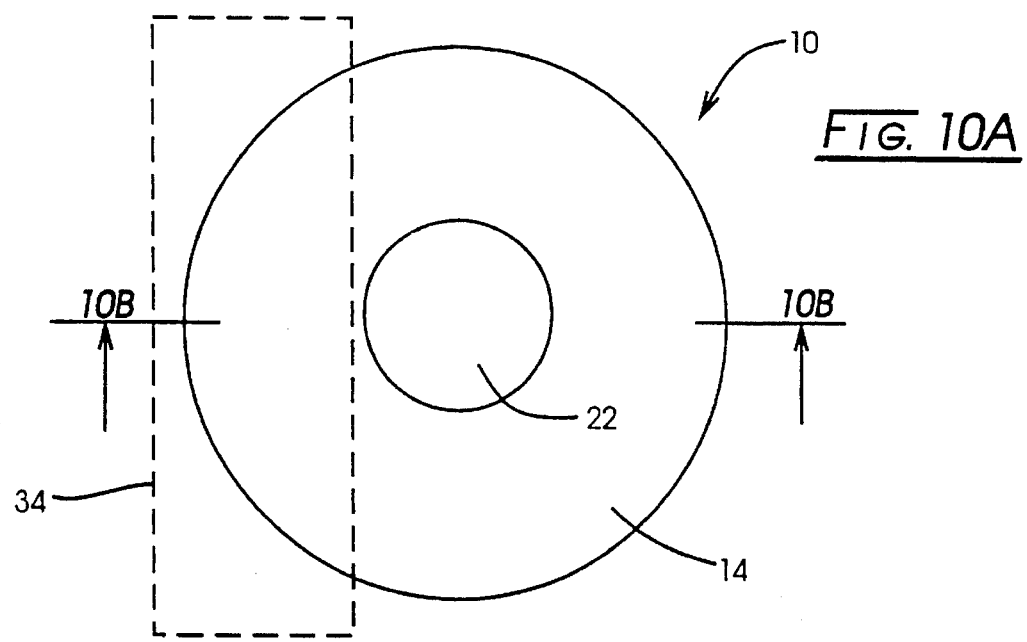
FIGS. 10A and B, respectively are an overhead plan view and a cross-sectional elevational view along line 10B—10B of another embodiment of the inventive abrasive particle composite compact which has an annular interface which permits the support to be exposed in a planar relationship with the upper abrasive particle layer surface.
Figure 10B:
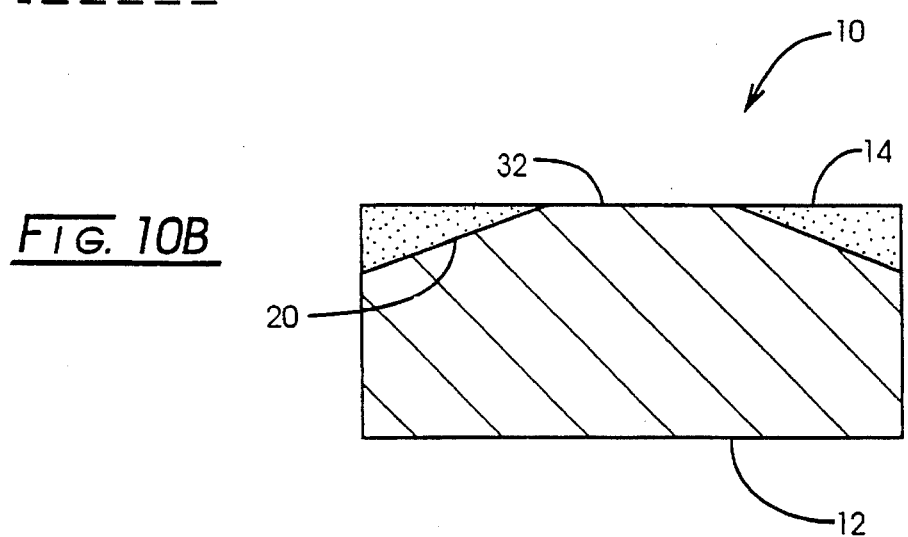

FIGS. 10A and B depict PDC 10 having sloping concentric contour 20 according to the invention wherein the sloping interface intersects top surface 32 of support layer 12. The useful cutting zone for composite compact 10 is indicated at item 34.

Yet a further embodiment of the novel abrasive tool insert is depicted at FIGS. 1–14. Advantageously, the cross-sectional profile depicted at FIG. 11 reduces the axial residual tensile stresses in the diamond or abrasive layer 14 at the wear or contact surfaces of the diamond or abrasive layer 14, thereby reducing spalling and premature wear in the abrasive layer 14.

Figure 11:
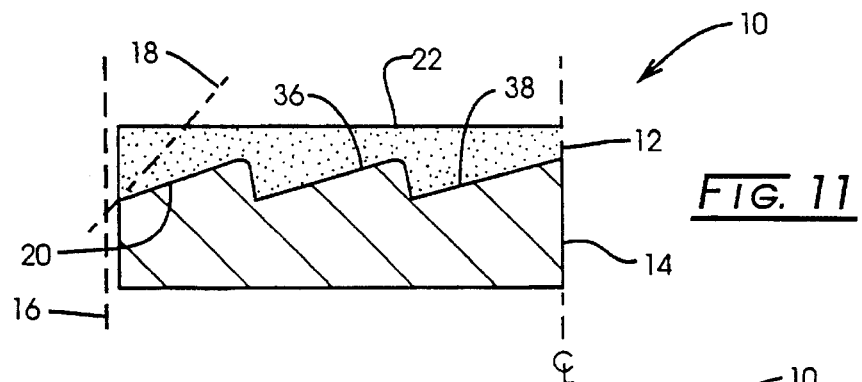
FIG. 11 is a cross-sectional elevational view of a different embodiment of the abrasive particle composite compact which has a sawtooth profile.
Figure 12:
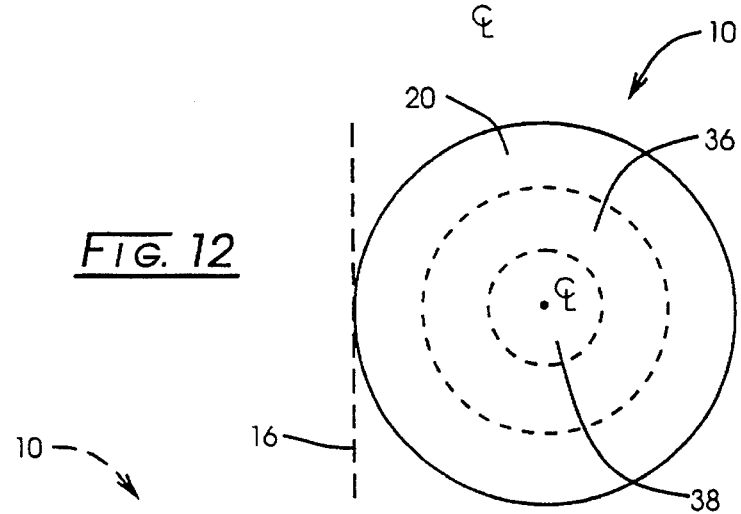
FIG. 12 is an overhead plan view of the abrasive particle composite compact of FIG. 11 which depicts an annular sawtooth profile.

There are many ways in which the sawtooth shaped cross-sectional profile depicted at FIG. 11 can be implemented in an industry compatible disc shaped abrasive compact. FIG. 12 shows PDC 10 wherein the top contours form concentric circular patterns about the centerline of PDC 10. Outwardly and downwardly sloping surfaces 20, 36, and 38 angle radially toward cutting surface 16. A radially cut cross-section of PDC 10 shows the characteristic sawtooth shaped profile of the interface as at FIG. 11.

Figure 13:
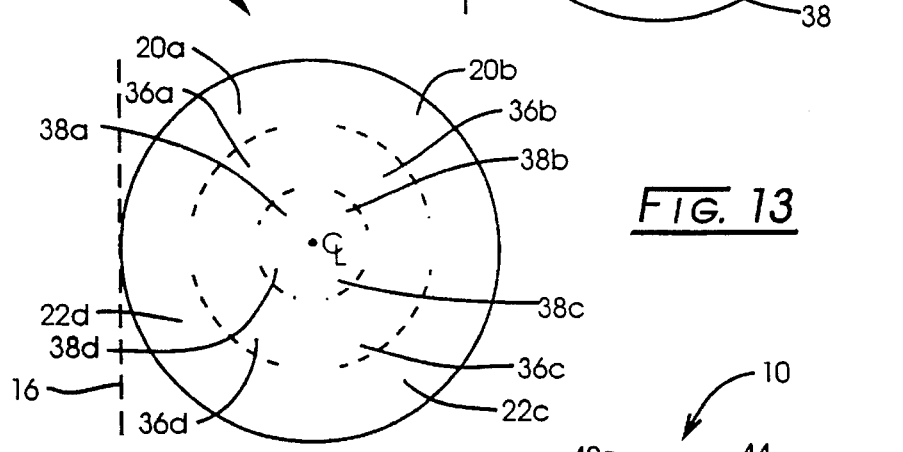
FIG. 13 is an overhead plan view of the abrasive particle composite compact of FIG. 11 which depicts an interrupted annular sawtooth profile.

FIG. 13 shows a similar PDC to that illustrated at FIG. 12 in which sloping surfaces 20, 36, and 38 are formed into a concentric circular segmented pattern having sawtoothed segments 20a, 36a, and 38a; 20b, 36b, and 36b; 20c, 36c, and 38c; and 20d, 36d, and 38d. Of course, a lesser or greater number of such sawtooth segments could be provided.

Figure 14:
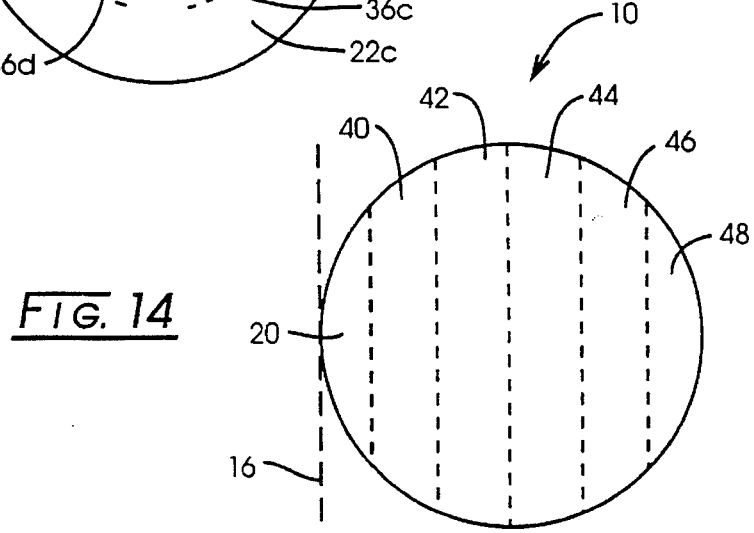
FIG. 14 is an overhead plan view of the abrasive particle composite compact of FIG. 11 which depicts a linear sawtooth profile.

FIG. 14 depicts PDC 10 having a linear pattern of sloping surfaces 20–48. A vertically cut cross-section of PDC 10 again would reveal the sawtooth shaped profile depicted at FIG. 11.

Other embodiments, such as one based on a spiral shaped pattern of slopes, also are possible. While the invention has been described with reference to the presently preferred embodiments thereof, it is understood that the scope of the invention shall be limited only in accordance with the following claims.

We claim:

1. An abrasive tool insert comprising:

a substrate having an end face, a continuous abrasive layer having a center, a periphery forming a cutting surface, an upper surface and a lower surface integrally formed on said end face of said substrate and defining an interface there between, said lower surface of said abrasive layer having at least one protrusion extending from said interface into the substrate and from said center to said periphery, said end face of said substrate having at least one slot for receiving said protrusion of said abrasive layer, wherein said interface includes at least one region extending from said cutting surface such that said abrasive layer is thicker at said cutting surface than at regions immediately and radially interior to said cutting surface.

2. The tool insert as defined in claim 1, wherein said abrasive layer further comprises a top flat surface, wherein said sloped region is sloped between about 10 to about 50 degrees to said upper surface.

3. The tool insert as defined in claim 2, wherein said sloped region is sloped between 25 to about 45 degrees to said upper surface.

4. The tool insert as defined in claim 1, wherein said substrate comprises cemented carbide.

5. The tool insert as defined in claim 1, wherein said abrasive layer comprises polycrystalline diamond.

\* \* \* \* \*